United States Patent [19]
Pope

[11] Patent Number: 5,102,295
[45] Date of Patent: Apr. 7, 1992

[54] THRUST FORCE-COMPENSATING APPARATUS WITH IMPROVED HYDRAULIC PRESSURE-RESPONSIVE BALANCE MECHANISM

[75] Inventor: Adam N. Pope, Cincinnati, Ohio
[73] Assignee: General Electric Company, Lynn, Mass.
[21] Appl. No.: 505,119
[22] Filed: Apr. 3, 1990
[51] Int. Cl.$^5$ ............................................. F01D 3/00
[52] U.S. Cl. ................................... 415/104; 415/107
[58] Field of Search .................. 415/104, 105, 107, 14

[56] References Cited

U.S. PATENT DOCUMENTS

| | | | |
|---|---|---|---|
| 3,347,553 | 10/1967 | Schweiger | 277/27 |
| 3,658,452 | 4/1972 | Kita | 415/104 |
| 4,268,220 | 5/1981 | Malott | 415/104 |
| 4,302,963 | 12/1981 | Collins | 415/14 |
| 4,578,018 | 3/1986 | Pope | 415/14 |
| 4,738,590 | 4/1990 | Butler | 416/129 |
| 4,916,892 | 4/1990 | Pope | 60/39.02 |

FOREIGN PATENT DOCUMENTS 238086 8/1986 Netherlands ........................ 415/14

*Primary Examiner*—John T. Kwon
*Attorney, Agent, or Firm*—Nathan D. Herkamp; Jerome C. Squillaro

[57] ABSTRACT

An axial thrust force-compensating apparatus is provided in a gas turbine engine having relatively rotatable first and second structures. The axial thrust force-compensating apparatus includes a first annular part mounted to the first engine structure and having an annular end surface, a second annular part mounted to the second engine structure and having an annular end surface which opposes and faces toward the end surface of the first annular part, and a primary hydraulic pressure balance mechanism for providing separate outer and inner fluid flows to the respective outer and inner regions between the end surfaces at pressures responsive to the amount of separation existing between the end surfaces at those regions. The separate fluid flows at the pressures produce a film of fluid flowing between and in contact with the respective end surfaces which generates primary compensating moment forces acting on the end surfaces to maintain the end surfaces in generally parallel relationship. The improved apparatus also has a secondary hydraulic pressure balance mechanism for producing secondary compensating moment forces which complement the primary compensating moment forces produced by the primary pressure balance mechanisms to limit the magnitude of any non-parallel relationship between the end surfaces of the first and second parts.

20 Claims, 6 Drawing Sheets

THRUST FORCE-COMPENSATING APPARATUS WITH IMPROVED HYDRAULIC PRESSURE-RESPONSIVE BALANCE MECHANISM

CROSS-REFERENCE TO RELATED APPLICATIONS

Reference is hereby made to the following copending U.S. patent applications dealing with related subject matter and assigned to the assignee of the present invention:

1. "Counter Rotation Power Turbine" by Kenneth O. Johnson, assigned U.S. Ser. No. 071,594, filed July 10, 1987, a continuation of application Ser. No. 728,466 and filed May 1, 1985, now abandoned, which was a continuation-in-part of application Ser. No. 437,923, filed Nov. 1, 1982, now abandoned.

2. "Interstage Seal Arrangement For Airfoil Stages of Turbine Engine Counterrotating Rotors" by Przytulski et al., assigned U.S. Ser. No. 07/505,120 and filed concurrently herewith.

3. "Turbine Blade Outer End Attachment Structure" by Przytulski et al., assigned U.S. Ser. No. 07/505,118 and filed concurrently herewith.

4. "Turbine Blade Inner End Attachment Structure" by Przytulski et al., assigned U.S. Ser. No. 07/505,121 and filed concurrently herewith.

5. "Thermally-Tuned Rotary Labyrinth Seal With Active Seal Clearance Control" by Starling, assigned U.S. Ser. No. 07/505,117 and filed concurrently herewith.

BACKGROUND OF THE INVENTION

1. Field of the Invention

The present invention relates generally to gas turbine engines and, more particularly, is concerned with an improved hydraulic pressure-responsive balance mechanism for maintaining parallelism between relatively rotatable fluid film-riding surfaces of an axial thrust force-compensating apparatus.

2. Description of the Prior Art

Gas turbine engines generally include a gas generator which comprises a compressor for compressing air flowing aft through the engine, a combustor in which fuel is mixed with the compressed air and ignited to form a high energy gas stream, and a turbine driven by the gas stream and connected for driving a rotor which, in turn, drives the compressor. Many engines further include a second turbine, known as a power turbine, located aft of the gas generator and which extracts energy from the gas flow to drive a rotating load with variable pitch blades such as found in the propulsor of helicopters, ducted turbofan engines, and turboprop engines.

A recent improvement over the turbofan and turboprop engines is an unducted fan engine such as disclosed in the first U.S. patent application cross-referenced above. In the unducted fan engine, the power turbine includes counterrotating rotors with turbine blades defining counterrotating airfoil stages which drive in corresponding fashion unducted fan blades radially located with respect to the power turbine. The fan blades of the unducted fan engine are variable pitched blades to achieve optimum performance. During operation, fuel efficiency of the engine can be increased by varying the pitch of the blade to correspond to specific operating conditions.

In the unducted fan engine, as in many other types of engines, large axial forces are generated on the rotors by reaction of their turbine blades to pressure drops across them. Ball thrust bearings between a stationary engine structure and the outer rotor and between the outer and inner rotors are used to prevent axial displacement of the rotors. However, the maximum load limits of the ball thrust bearings are typically less than the amount of axial thrust force generated by the blades.

A labyrinth gas seal which is used in the unducted fan engine to minimize leakage of pressurized gas flow to outside the flowpath between the rotors and resulting reduction of engine performance, is also employed to take up the additional axial force over the maximum allowable for the ball thrust bearings to protect the bearings. However, the labyrinth seal is a large diameter seal which must have a relatively large radial clearance to accommodate differential thermal growth between opposing components of the seal. The large clearance imposes a high performance penalty on the engine, for instance approaching one percent performance loss, due to relatively large leakage and accompanying loss of energy through the seal.

One way to reduce the performance penalty of this large diameter seal is to reduce its diameter. For example, if the diameter of the seal could be reduced by one-half, gas leakage could be reduced by three-fourths. However, reduction of the labyrinth seal diameter to reduce the performance penalty also reduces the utility of the seal for balancing off the axial thrust forces to protect the ball thrust bearings of the engine.

Consequently, in order to attain improvement in engine performance by reduction of labyrinth seal diameter size, an alternative approach is needed to balance off the axial thrust forces to protect the ball thrust bearings of the engine.

SUMMARY OF THE INVENTION

The present invention provides an improved axial thrust force-compensating apparatus designed to satisfy the aforementioned needs. The improved apparatus of the present invention has primary and secondary hydraulic pressure-responsive balance mechanisms for generating primary and secondary compensating moment forces to maintain parallelism between relative rotatable fluid film-riding bearing surfaces of the apparatus to prevent contact between the fluid film-riding surfaces. The primary and secondary hydraulic pressure balance mechanisms encompass a plurality of orifices, pockets, conduits and compartments defined in the respective opposing and relatively rotating parts of the thrust force-compensating apparatus which function to maintain the fluid film-riding end surfaces thereof in the generally parallel relationship.

Accordingly, the present invention is directed to an axial thrust force-compensating apparatus in a gas turbine engine having relatively rotatable first and second structures. The axial thrust force-compensating apparatus comprises: (a) a first annular part mounted to the first engine structure and having an annular end surface; (b) a second annular part mounted to the second engine structure and having an annular end surface which opposes and faces toward the end surface of the first annular part; and (c) primary pressure balance means for producing separate outer and inner fluid flows through the first annular part to respective outer and inner regions between the end surfaces of the first and second parts at pressures responsive to the amount of separation existing between the end surfaces at the regions. The separate fluid flows at the respective pressures produce a film of fluid flowing between and in contact with the respective end surfaces which generates primary compensating moment forces acting on the end surfaces to maintain the end surfaces in generally parallel relationship.

More particularly, the primary pressure balance mechanism includes a plurality of hydrostatic pockets and pluralities of outer and inner flow control orifices. The hydrostatic pockets are defined in the annular end surface of the first annular part. Each pocket spans a separate arcuate portion of the end surface of the first part and faces toward the end surface of the second part. Also, each pocket is formed by a pair of radially spaced and separate outer and inner arcuate-shaped grooves being unconnected to one another. The outer and inner pluralities of flow control orifices are defined in the first annular part for receiving a pressurized flow of fluid. The outer orifices open into the outer grooves and the inner orifices open into the inner grooves for communicating the inner and outer fluid flows to the respective outer and inner grooves at the pressures responsive to the amount of separation existing between the end surfaces of the first and second annular parts at the regions of the outer and inner grooves.

Further, the improved apparatus has a secondary hydraulic pressure balance means for producing secondary compensating moment forces which complement the primary compensating moment forces produced by the primary pressure balance means to limit the magnitude of any non-parallel relationship between the end surfaces of the first and second annular parts. There are several different embodiments of the secondary pressure balance means.

In one embodiment, the secondary pressure balance means includes first and second conduits formed in opposite diametric relationships across the second annular part from the one end surface thereof to and opposite end surface. The conduits are circumferentially spaced from one another about the part so that they do not intersect and communicate with one another. The first and second conduits provide independent flow communication from the outer and inner grooves of the first part 78 to inner and outer compartments communicating with the opposite end surface of the second part.

Thus, the pressures of fluid flows from respective outer and inner control orifices into outer and inner grooves of the pockets in the first part 78 which maintain parallelism between the interface end surfaces are transmitted through the first and second conduits to the inner and outer compartments so that the latter can be pressurized to different pressures independently.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
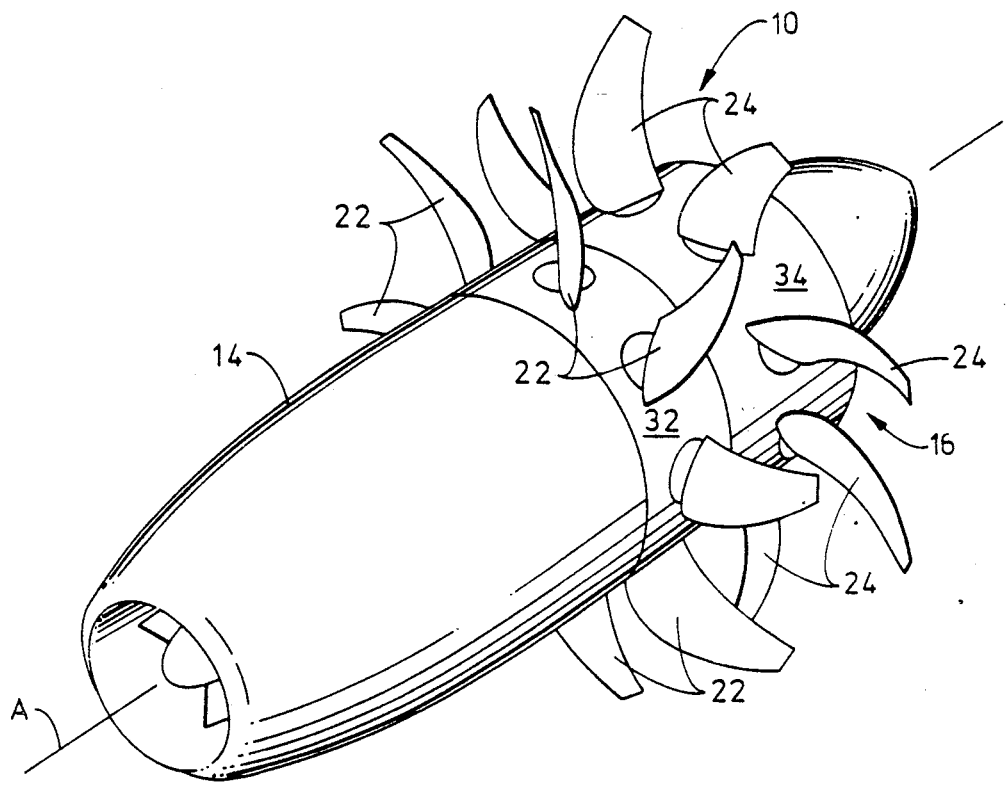
FIG. 1 is a perspective view an unducted fan type gas turbine engine in which an improved axial thrust force-compensating apparatus of the present invention can be employed.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly, to FIG. 1, there is shown a gas turbine engine 10 of the unducted fan type which can incorporate the preferred embodiment of the improved axial thrust force-compensating apparatus of the present invention, generally designated 12 in FIGS. 5, 8, 9 and 10. The engine 10 has an outer shroud or nacelle 14 which encompasses a forward gas generator (not shown) and an aft power turbine 16, illustrated schematically in FIG. 2. In a known manner, the gas generator produces combustion gases which are channeled to the power turbine 16.

Figure 2:
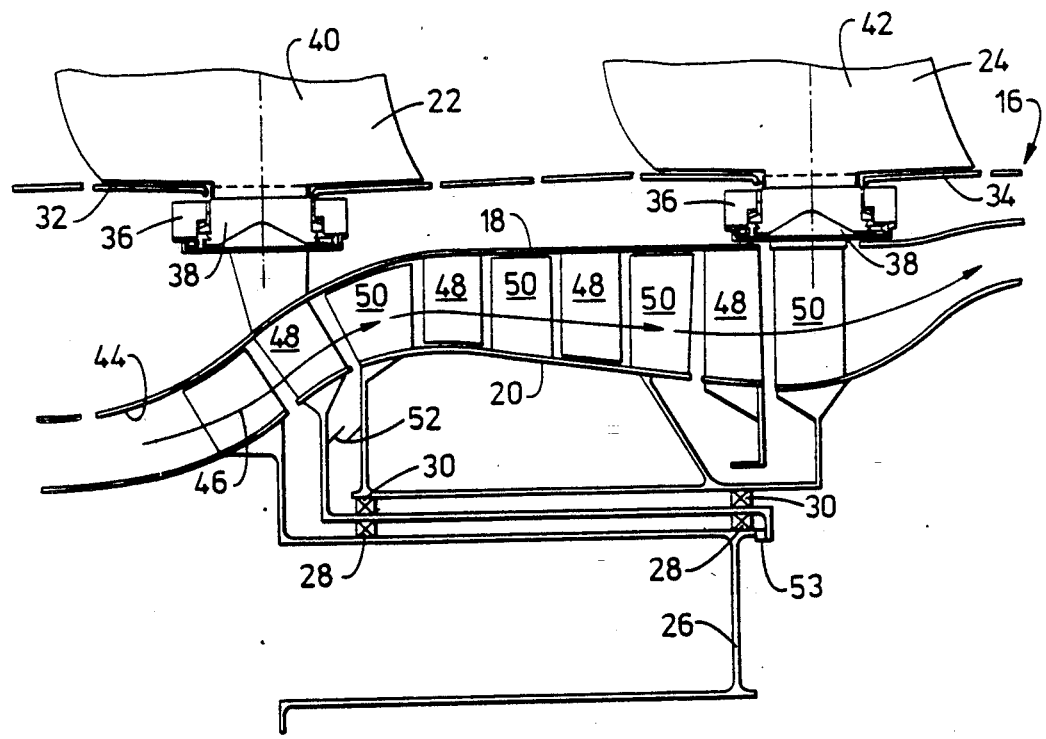
FIG. 2 is a schematic axial sectional view of a turbine section of the unducted fan engine of FIG. 1.

As seen in FIG. 2, the power turbine 16 includes outer and inner annular turbine rotors 18, 20 which are adapted to rotate in opposite directions, or counterrotate, about a longitudinal centerline axis A of the engine 10. The rotors 18, 20 respectively mount for rotation therewith tamdemly-arranged forward and rearward sets of propulsor blades 22, 24. The outer rotor 18 is rotatably mounted about a hollow static structure 26 of the engine 10 by a first set of bearings 28, whereas the inner rotor 20 is rotatably mounted within the outer rotor 18 by a second set of bearings 30.

The nacelle 14 encompasses the rotors 18, 20 with the sets of propulsor blades 22, 24 extending circumferentially and radially outward from the exterior of the nacelle 14. The nacelle 14 includes a forward sleeve 32 which is coupled to and rotatable with the forward set of propulsor blades 22, and a rearward sleeve 34 which is coupled to and rotatable with the rearward set of propulsor blades 24. The exterior configuration of the nacelle 14 provides proper air flow characteristics to optimize the performance of the propulsor blades 22, 24 and thereby of the engine 10.

To further optimize the performance of the engine 10, the pitch of the propulsor blades 22, 24 can be varied to correspond to specific operating conditions. The blades 22, 24 of the forward and rearward sets thereof are rotatably mounted by hubs 36 to the interior sides of the forward and rearward nacelle sleeves 32, 34 and coupled to pitch varying mechanisms 38 operable for rotating the blades 22, 24 about respective pitch change axes 40, 42. Attention is directed to U.S. Pat. No. 4,738,590, which issued to Butler and is assigned to the assignee of the present invention, for gaining a detailed understanding of the blade pitch varying mechanisms.

The aft power turbine 16 also has an annular gas flowpath 44 for receiving combustion gases from the forward gas generator of the engine 10. The gas flowpath 44 extends between the outer and inner rotors 18, 20 of the power turbine 16 and combustion gases flow therethrough as a high energy gas stream 46. The rotors 18, 20 of the power turbine 16 respectively mount, via attachment structures (not shown), axially spaced rows of circumferentially and radially extending turbine blades 48, 50 which alternate with one another so as to define counterrotatable airfoil stages extending across the annular gas flowpath 44. Also, outer and inner interstage seal structures (not shown) are provided for preventing passage of the gas stream 46 between the outer and inner rotors 18, 20 and outer and inner ends of the respective turbine blades 50, 48.

Thus, the high energy gas stream 46 flowing through the annular gas flowpath 44 between the rotors 18, 20 causes the sets of turbine blades 48, 50 to turn or move in opposite directions about circular paths, in turn, causing the respective rotors 18, 20 to counterrotate and correspondingly counterrotatably drive the sets of propulsor blades 22, 24.

In the unducted fan engine 10 as in all types of gas turbine engines, large axial forces are generated on the outer and inner rotors 18, 20 by reaction of their turbine blades 48, 50 to pressure drops across them. The first and second sets of bearings 28, 30 include respective ball thrust bearings (not shown) between the static structure 26 and the outer rotor 18 and between the outer and inner rotors 18, 20 which are used to prevent axial displacement of the rotors 18, 20. However, the maximum load limits of the ball thrust bearings are typically less than the amount of axial thrust force generated by the blades 48, 50.

A gas seal, such as labyrinth rotary seal 52 in FIG. 2, is used in the engine 10 to take up the additional axial force over the maximum allowable for the thrust bearings of the bearing sets 28, 30 to protect the thrust bearings by limiting loading thereof. The labyrinth seal 52 is also employed to minimize leakage of pressure to outside the flowpath 44 between the rotors 18, 20 which would result in reduction of engine performance. However, the labyrinth seal 52 is a large diameter seal which must have a relatively large radial clearance to accommodate differential thermal growth between opposing components of the seal. The large clearance typically imposes a high performance penalty on the engine, for instance approaching one percent performance loss, due to relatively large leakage and accompanying loss of energy through the seal.

One way to reduce the performance penalty of this large diameter seal is to reduce its diameter. For example, if the diameter of the seal could be reduced by one-half, gas leakage could be reduced by three-fourths. However, reduction of the labyrinth seal diameter to reduce the performance penalty also reduces the utility of the seal 52 for balancing off the axial thrust forces to protect the thrust bearings of the engine 10.

Prior Art Axial Thrust Force-Compensating Apparatus

If reduction of the diameter of the labyrinth rotary seal 52 is to be undertaken in order to reduce radial seal clearance and thereby minimize engine performance losses due to leakage from the gas stream 46 through the labyrinth seal 52, one approach might be to use a thrust force-compensating apparatus at the region of the thrusted rotors to protect the engine thrust bearings at the location 53 as shown in FIG. 2. A prior art thrust force-compensating apparatus 54 shown in FIGS. 3 and 4 might seem to be a candidate for such application.

The prior art force-compensating apparatus 54 includes a pair of opposing non-rotating and rotating annular parts 56, 58. The non-rotating part 56 is mounted to a stationary structure 60, such as a stator or a housing, whereas the rotating part 58 is connected to a rotating structure (not shown), such as a rotor or a shaft. The non-rotating part 56 has an annular film-riding surface 56A with a plurality of hydrostatic pockets 62 defined therein, each spanning slightly less than 120 degrees of the surface. Each pocket 62 is formed by a pair of radially spaced outer and inner arcuate-shaped grooves 62A, 62B interconnected at their opposite ends by short radially-extending grooves 62C. The other rotating part 58 also has a film-riding surface 58A which opposes and faces toward the surface 56A of the non-rotating part 56.

Also, a recess 64 is formed in the surface 56A at the mid-point of the inner and outer grooves 62A, 62B of the hydrostatic pocket 62. A single small diameter flow control orifice 66 is formed in the non-rotating part 56 between the recess 64 of each pocket 62 and one of a plurality of larger diameter orifices 68. A passage 70 is provided in the stationary structure 60 which communicates with the orifice 66 in the non-rotating part 56 via a clearance space 72 therebetween which is sealed at axially displaced locations by stationary annular seal rings 74 seated in annular recesses 76 defined in the stationary structure 60.

A pressuring fluid medium is ported through the passage 70 and bore 68 of the stationary structure 60 and non-rotating part 56 at a pressure level $P_1$ to the inlet of control orifices 66 which feed the fluid medium to the hydrostatic pockets 62, with the ambient pressures $P_2$, $P_3$ downstream of the pockets 62 being lower than pressure $P_1$. If the clearance (h) at the interface of the non-rotating part surface 56A and the rotating part surfaces 58A is zero, the pressure $P_G$ in the hydrostatic pockets 62 is equal to the pressure $P_1$ upstream of the control orifice 66, since the orifice restriction cannot drop the pressure of the medium in the absence of flow.

Figures 3, 5:
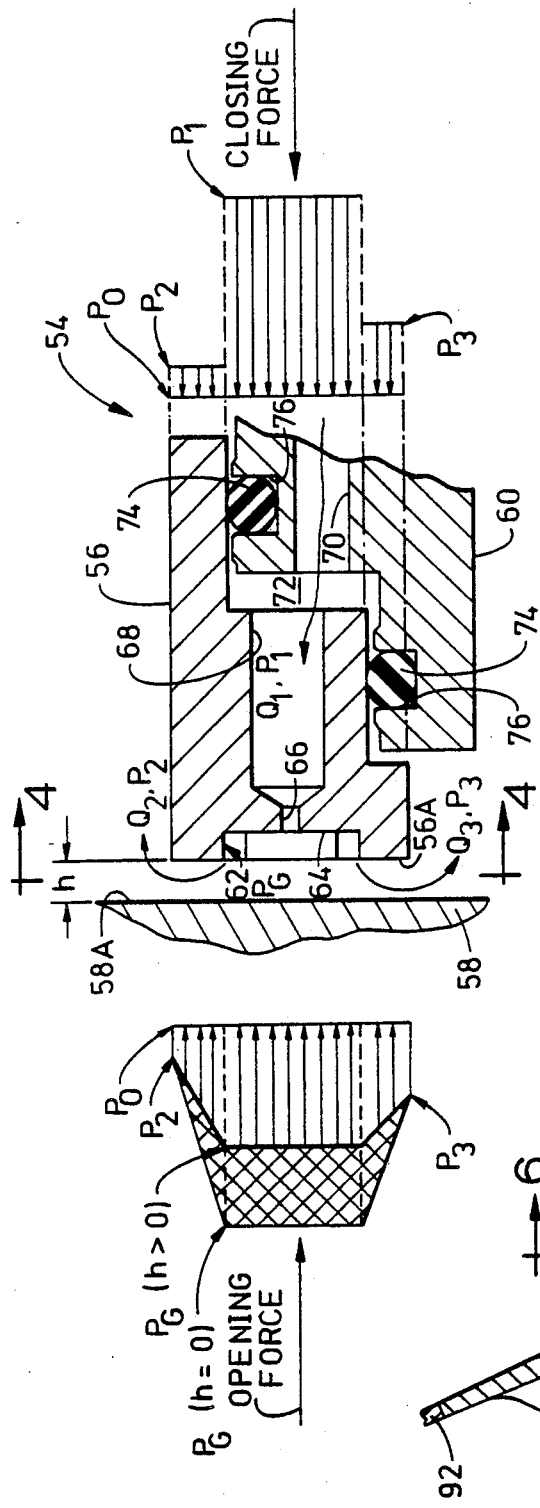
FIG. 3 is an axial sectional view of a prior art axial thrust force-compensating apparatus.
FIG. 5 is an axial sectional view of the improved thrust force-compensating apparatus of the present invention.
Figure 4:
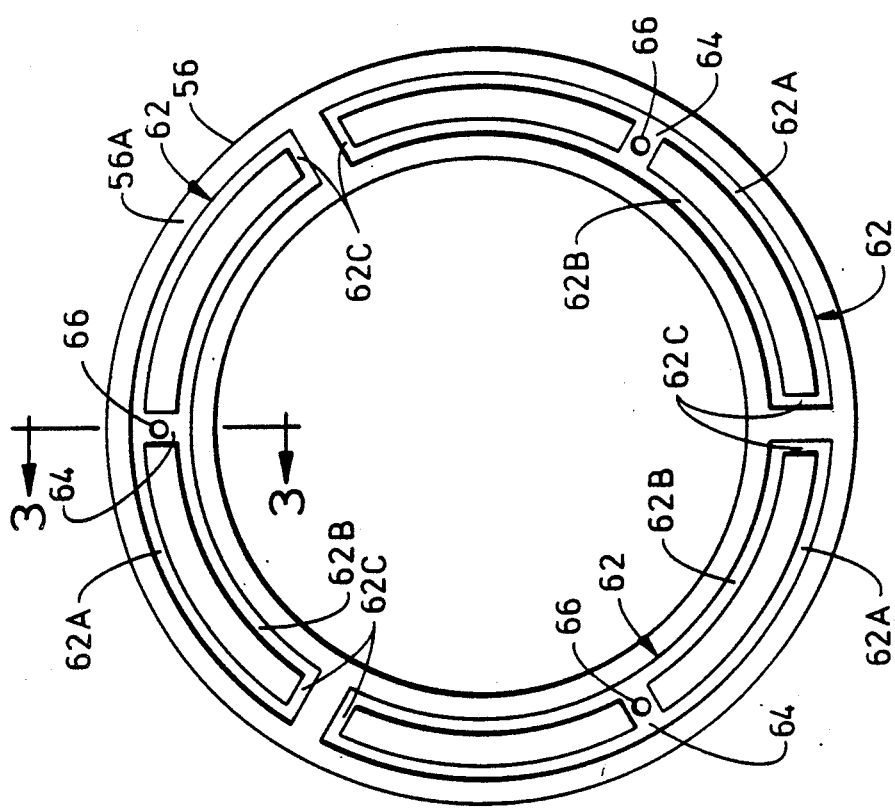
FIG. 4 is an enlarged full face view of one fluid film-riding end surface of the prior art apparatus of FIG. 3, the portion seen along line 4—4 in FIG. 3 being that located between spaced lines 3,3 in FIG. 4.

However, since the surface area at the interface of the surfaces 56A, 58A, where pressure acts in the direction to cause a separation between the parts 56, 58, is sufficiently larger than the area bounded radially between the secondary seal rings 74, against which pressure acts in the direction to close the separation, a servo pressure (as represented by the cross-hatched region of the force lines at the left in FIG. 3 extending between $P_G$ at $h=0$ and $P_G$ at $h>0$) is inherently provided which forces the interface open. When the interface opens, a single rate of fluid flow $Q_1$ is established through the orifice 66 which is equal to the sum of the rates of interface fluid flows $Q_2$, $Q_3$ in opposite directions between the opened surfaces 56A, 58A. Flow of the fluid medium through the orifice 66 requires a pressure drop and causes the hydrostatic pocket pressure $P_G$ to decrease with respect to $P_1$ until the opening force at the interface establishes equilibrium with the closing force. At equilibrium, the pressure forces at opposite sides of the non-rotating part 56 are balanced, and an interface clearance for flow of a fluid film is established when this equilibrium is reached. The fluid film prevents rubbing contact between the surfaces 56A, 58A.

The above-described orifice-compensated hydrostatic pockets 62 are well known as a way of generating a gas or liquid film separation to prevent rubbing contact and the attendant high wear and heat generation rates at the interface between the stationary and rotating parts 56, 58 of the apparatus 54. The film is designed to be very thin in order to attain sufficient film stiffness (ratio of film force to film thickness) to prevent interface rubbing while maintaining reasonably low leakage flow rates of the pressurizing medium. Film thicknesses are generally less than 0.001 inch for liquids and 0.0005 inch for gases.

One prime limitation of the above-described construction of the prior art apparatus 54 lies in the inability to maintain sufficient surface flatness to prevent rubbing contact at the interface of the two relatively rotating part surfaces 56A, 58A of the apparatus 54 while maintaining the low weight necessary for aircraft engine structures. Lightweight structures derived heretofore to control the cross-sectional torsional strain effects of pressure, centrifugal and thermal forces have relied heavily on stiffness by virtue of size and/or tolerance control to precisely shape geometry with respect to forces so as, essentially, to attain a summation of section moments equal to zero. This tends to be heavy and/or expensive and becomes less effective and more unreliable as technological requirements inevitably push these forces to greater magnitudes. For example, axial thermal gradients in the non-rotating part 56 only of approximately 14 degrees F will generate a taper at the surface interface equal to the design clearance between the parts 56, 58.

Thus, the hydraulic pressure balance mechanism formed by the control orifices 66 and the inner and outer grooves 62A, 62B of the hydrostatic pockets 62 in the non-rotating part 56 of the prior art apparatus 54 has limitations which would fail to prevent rubbing contact between the surfaces 56A, 58A when they assume non-parallel tapered relationships due to the effects of pressure, centrifugal and thermal forces reducing the space between them to less than their design clearance. These limitations make the prior art apparatus 54 inadequate for use in protecting the engine thrust bearings.

Improved Axial Thrust Force-Compensating Apparatus

Figure 6:
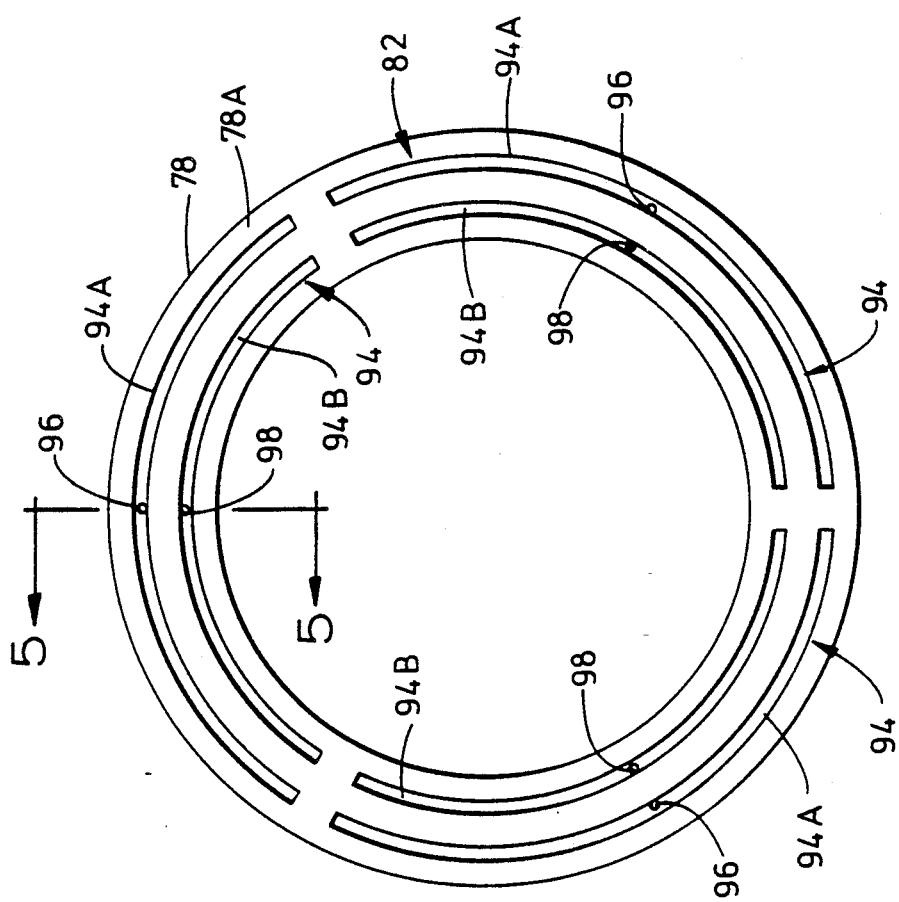
FIG. 6 is an enlarged full face view of one fluid film riding end surface of the improved apparatus of FIG. 5, the portion seen along line 6—6 in FIG. 5 being that located between spaced lines 5,5 in FIG. 6.
Figure 8:
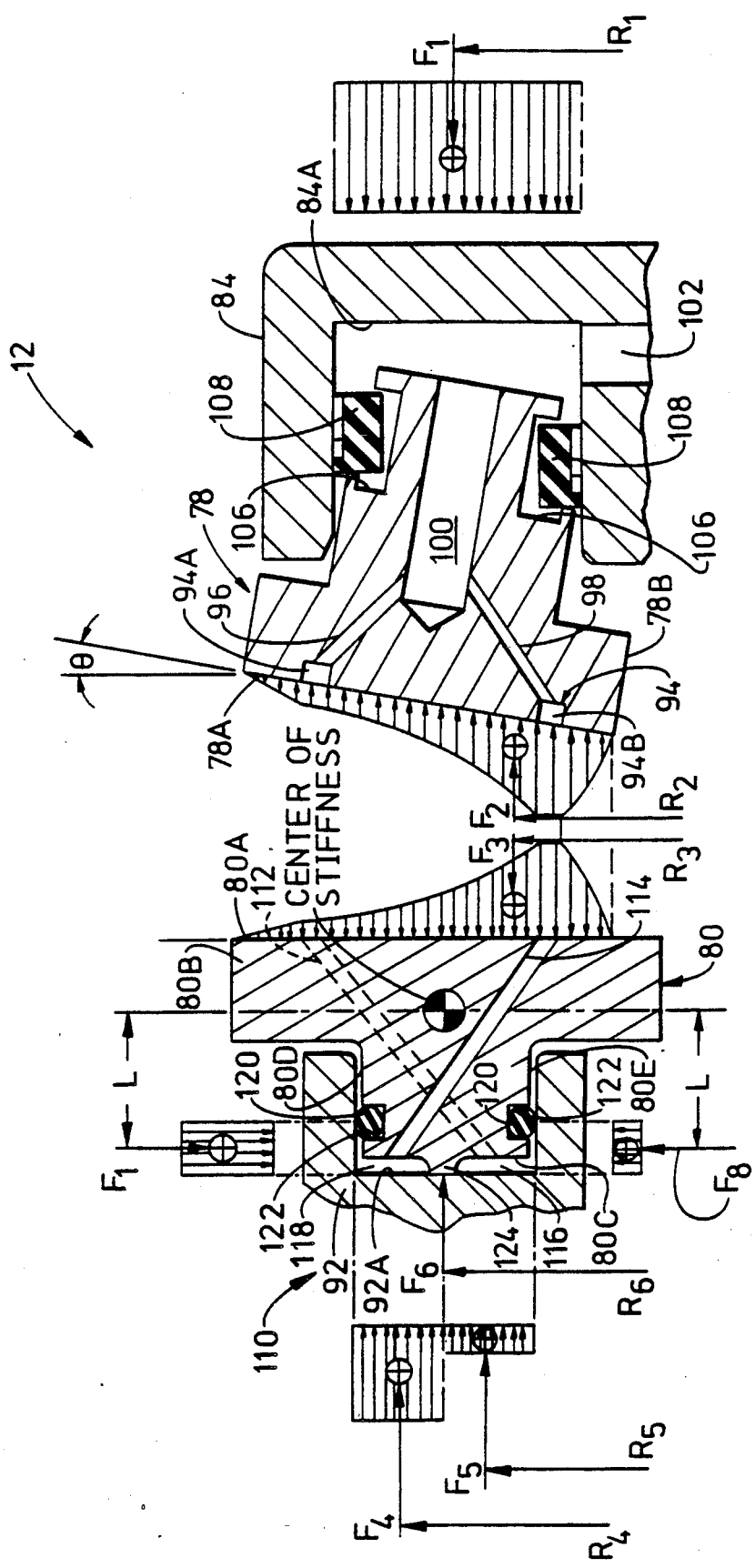
FIG. 8 is a schematic enlarged axial sectional view of the improved apparatus of FIG. 5, illustrating the generation of primary and secondary compensating moment forces which maintain its interface end surfaces in generally parallel relationship.

The improved axial thrust force-compensating apparatus 12 of the present invention shown in FIGS. 5, 6 and 8 overcomes the limitations of the prior art apparatus 54 and thus can be employed to balance off the axial thrust forces to protect the ball thrust bearings of the engine 10. In the application illustrated in FIG. 5, the improved apparatus 12 is used in balancing axial thrust of a rotor with the pressurizing fluid being engine lubricating oil. The improved apparatus 12 can be used equally in other applications, for example, as a main engine sump intershaft air/oil seal in a gas turbine engine.

In its basic components, the improved axial thrust force-compensating apparatus 12 includes a pair of opposing non-rotating and rotating annular parts 78, 80 and a primary hydraulic pressure balance mechanism, generally designated 82. The non-rotating part 78 is mounted to a stationary annular housing 84 which, in turn, is attached by suitable fastening means, such as a spanner nut 86 and rotation locks and centering splines 88, to a stationary shaft 90. The rotating annular part 80 is mounted to a rotating rotor 92. Specifically, the non-rotating part 78 is fitted and mounted within an annular recess or cavity 84A formed in the stationary housing 84, whereas rotating part 80 is fitted and mounted within an annular recess or cavity 92A formed in the rotating rotor 92. The non-rotating and rotating annular parts 78, 80 have respective annular end surfaces 78A, 80A formed on enlarged flanges 78B, 80B of the relatively rotatable parts 78, 80 which oppose and face toward one another. The flanges 78B, 80B define inner areas at the end surfaces 78A, 80A which are larger than outer areas on opposite ends of the parts 78, 80.

Also, as best seen in FIG. 6, the primary hydraulic pressure balance mechanism 82 of the improved apparatus 12 includes a plurality of hydrostatic pockets 94 defined in the annular surface 78A of the non-rotating annular part 78, each pocket 94 spanning slightly less than 120 degrees of the surface 78A. Each pocket 94 is formed by a pair of radially spaced separate outer and inner arcuate-shaped grooves 94A, 94B. Unlike the outer and inner grooves 62A, 62B of each pocket 62 of the prior art apparatus 54, the grooves 94A, 94B of each pocket 94 of the improved apparatus 12 are not connected to one another.

Figure 7:
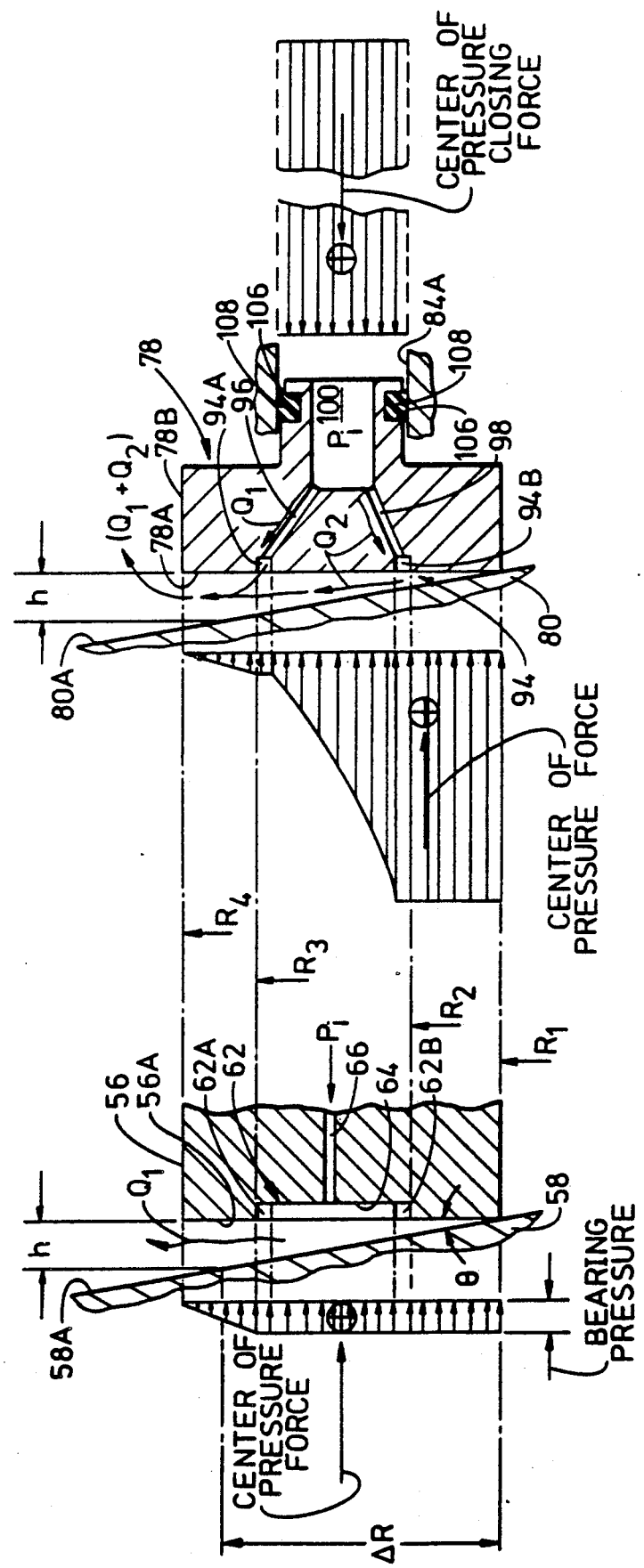
FIG. 7 is a schematic axial sectional view comparing how the prior art apparatus and the improved apparatus react to the same non-parallelism at their respective interface end surfaces.

Further, as seen in FIGS. 5-7, the primary hydraulic pressure balance mechanism 82 includes outer and inner pluralities of small diameter flow control orifices 96, 98 defined in the non-rotating part 78. Each respective outer orifice 96 opens into and at the mid-point along one of the outer grooves 94A, whereas each respective inner orifice 98 opens into and at the mid-point along one of the inner grooves 94B of each hydrostatic pocket 94. The respective outer and inner orifices 96, 98 extend convergently and in flow communication from the respective outer and inner grooves 94A, 94B to one of a plurality of larger diameter orifices 100 defined in the non-rotating part 78 for receiving a pressurized flow of fluid from the orifices 100. The fluid flow from the orifices 100 divides at the outer and inner flow control orifices 96, 98 which, in turn, communicate outer and inner fluid flows $Q_1$, $Q_2$ (FIG. 7) to the respective outer and inner grooves 94A, 94B at pressures responsive to the amount of separation existing between the end surfaces 78A, 80A of the non-rotating and rotating annular parts 78, 80 at the regions of the outer and inner grooves 94A, 94B.

Each bore 100 in the non-rotating part 78 opens at the aft end thereof opposite the end surface 78A and thus communicates with the annular cavity 84A within which the part 78 is mounted. A passage 102 is provided in the stationary annular housing 84 which communicates with the annular cavity 84A of the housing 84 and thus with the orifices 100 of the part 78. Another passage 104 is provided in the stationary shaft 90 which communicates with the housing passage 102. High pressure fluid is introduced to the orifices 100 and the aft end surface area of the non-rotating part 78 via the passages 102, 104 and the cavity 84A.

The non-rotating annular part 78 has annular circumferential recesses 106 defined in its outer and inner surfaces which seat outer and inner seal rings 108. The seal rings 108 bound the aft surface area of the part 78 upon which acts the pressure $P_1$ of the fluid introduced via the passages 102, 104. The seal rings 108 restrict leakage of the pressurizing fluid through the radial clearance between the part 78 and the housing 84 while allowing the non-rotating part 78 to slide axially with respect to the stationary housing 84 within the annular cavity 84A thereof as required to adjust to the varying relative axial positions of the shaft 90 and rotor 92.

The area of the forward end surface 78A is sufficiently larger than the area of the opposite aft end surface of the part 78 defined between the seal rings 108 so as to cause a greater force to be generated on the forward end surface 78A than on the aft end surface if the pressure in the outer and inner grooves 94A, 94B is equal to the pressure on the aft end surface. The pressures at the aft end surface and the outer and inner grooves are equal if the clearance between the end surfaces 78A, 80A is zero, since flow rates through the control orifices 96, 98 are zero when that clearance is zero and thus the orifices cannot affect a pressure drop in the absence of flow. But because the interface area of the end surfaces 78A, 80A of the parts 78, 80 is sufficiently larger than the area of the aft end surface of the part 78, it is necessary for the interface to separate and allow sufficient rates of flow through the control orifices 96, 98 to drop the pressure at the interface so that equilibrium of axial forces is achieved. An interface film of a particular thickness is established when this equilibrium occurs.

FIG. 7 illustrates a comparison between operation of the hydraulic pressure balance mechanism of the prior art apparatus 54 and the primary hydraulic pressure balance mechanism 82 of the improved apparatus 12. A limiting case is illustrated wherein a taper is introduced between the respective end surfaces 56A, 58A of parts 56, 58 and respective end surfaces 78A, 80A of parts 78, 80 such that the clearance between the surfaces approaches zero at the inner radius of the parts 56 and 78 and all fluid flowing from the end surfaces exits at the outer radius. The relative levels of pressure and comparison of interface pressure profiles for the prior art and improved embodiments are as shown. Also compared are the relative locations of centers of bearing pressure forces with respect to the center of pressure closing force acting in the opposite direction.

With respect to the improved apparatus 12 on the right in FIG. 7, the bearing pressure force, which is required to prevent interface rubbing, remains substantially higher for equal magnitudes of taper. In addition, the location of the center of pressure forces at the interface shifts substantially farther into the direction of the convergence and away from the center of pressure of the closing force in the case of the improved apparatus 12. The effect is a significant pressure force moment which acts in the direction to substantially diminish the magnitude of taper generated by parasitic forces (such as produced by axial thermal gradients) in the improved apparatus 12. By symmetry it should be clear that this effect is equally advantageous regardless of the direction of taper.

Thus, extrapolating from what is shown in FIG. 7, in normal operation the separate outer and inner orifices 96, 98 of the primary pressure balance mechanism 82 of the improved apparatus 12 produces a pair of separate outer and inner fluid flows $Q_1$, $Q_2$ through the non-rotating part 78 to respective outer and inner regions between the end surfaces 78A, 80A of the parts 78, 80 at pressures responsive to the amount of separation existing between their end surfaces at the regions. The separate fluid flows $Q_1$, $Q_2$ at the respective pressures produce a film of fluid flowing at the combined rates of flows $Q_1$ and $Q_2$ between and in contact with the respective end surfaces 78A, 80A which generates primary compensating moment forces acting on the end surfaces 78A, 80A, which if they are tapered or not parallel with respect to one another, deflect or flex the non-rotating part 78 so as to maintain the end surfaces 78A, 80A in generally parallel relationship.

In contrast thereto, the pressure balance mechanism of the prior art apparatus 54 produces a single fluid flow $Q_1$ through the non-rotating part 56 to the general interface region between the end surfaces 56A, 58A of the parts 56, 58 which, because of the configuration of the pockets 62 and the common orifice 66, produces a uniform pressure at the interface responsive to the amount of separation existing between their end surfaces at the region. The fluid flow $Q_1$ at the respective pressure produces a film of fluid flowing at the same rate of flow $Q_1$ between and in contact with the respective end surfaces 56A, 58A which generates compensating forces acting on the end surfaces 78A, 80A to maintain the end surfaces in generally parallel relationship so long as a taper condition does not arise at the interface. If a taper condition arises, no compensating moment forces act on the end surfaces to return them to generally parallel relation.

Referring to FIGS. 5 and 8, there is shown one embodiment of a supplementary or secondary hydraulic pressure balance mechanism 110 of the improved apparatus 12. The secondary pressure balance mechanism 110 is defined in the rotating part 80 for producing supplementary or secondary compensating moment forces which complement the primary compensating moment forces to limit the magnitude of interface taper between the parts 78, 80.

More particularly, the secondary pressure balance mechanism 110 includes circumferentially-spaced non-intersecting pluralities of first and second conduits 112, 114 formed in the rotating part 80 and extending generally in reverse or opposite diametric relationships across the rotating part 80 from the aft end surface 80A to the opposite forward end surface 80C thereof. The conduits 112, 114 do not intersect one another; they are circumferentially spaced from one another about the part 80. The first and second conduits 112, 114 provide flow communication from the outer and inner grooves 94A, 94B of the non-rotating part 78 to inner and outer compartments 116, 118 formed in flow communication with the annular cavity 92A of the rotor 92 at the forward end surface 80A of the part 80 between respective inner and outer static seal rings 120 in annular circumferential recesses 122 of part 80 and a static land 124 which projects from the part forward end surface 80A and into contact with the rotor 92 into the annular cavity 92A.

Thus, the pressures of fluid flows $Q_1$, $Q_2$ from respective outer and inner control orifices 96, 98 into outer and inner grooves 94A, 94B of the pockets 94 in the non-rotating part 78 which are established at the above-described equilibrium condition are transmitted through the criss-crossed offset first and second conduits 112, 114 to the inner and outer compartments 116, 118. The inner and outer compartments 116, 118 can then be pressurized to different pressure levels independently.

By referring to FIG. 8, it can be seen that significant additional compensating moment forces can be generated to limited the magnitude of the interface taper by venting the pressure in the discrete outer and inner pocket grooves 94A, 94B on the end surface 78A of the non-rotating part 78 through the first and second conduits 112, 114 in the rotating part 80 to pressurize discrete inner and outer compartments 116, 118 on the forward end surface 80C of the rotating part 80 such that the outer compartment 118 is at the pressure of the inner groove 94B while the inner compartment 116 is at the pressure of the outer groove 94A. As shown, the hydraulic (or pneumatic) axial forces $F_1$ and $F_2$, and $F_2$ and $F_3$, are equal and opposite in direction, and the sum of axial forces $F_4$, $F_5$ and $F_6$ is equal and opposite in direction to axial force $F_3$. Two additional radial forces $F_7$ and $F_8$ are also generated. The sum of pressure moments acting on the rotating part 80 is as follows:

$$MA = (F_4 \times R_4) + (F_5 \times R_5) + (F_6 \times F_6) - (F_3 \times R_3) - (F_7 - F_8) \times L.$$

Without the pressure conduits 112, 114 through the rotating part 80, the sum of moments is:

$$MB = (F_6 \times R_6) - (F_3 \times R_3), \text{ since } F_6 = F_3,$$
$$MB = F_3 \times (R_6 - R_3).$$

It can be shown that MA is substantially larger than MB as long as $(F_7-F_8)$ and/or L are reasonably small and, therefore, that the addition of the conduits 112, 114 in the rotating part 80 as shown offers a significant advantage in preservation of parallelism between the interface end surfaces 78A, 80A of the parts 78, 80 and, therefore, preservation of the fluid film and reduction in probability of rubbing contact.

Other important features particularly apparent in the embodiment of FIGS. 5 and 8 are as follows. First, the transverse face pressure area bounded radially between the seal rings 108 on the part 78 is larger than the radial area bounded by the static seal rings 120 on the part 80. As a result, fluid pressure assures that the rotating part 80 remains seated axially with the static land 124 contacting the opposing face of the rotor 92 within the cavity 92A. With this feature the necessity of rigidly clamping the rotating part 80 is removed and clamping distortion problems are eliminated. In the absence of fluid pressure a suitable mechanical axial loading spring 126 performs this seating function. Second, seal rings 108 are maintained in a fixed axial position with respect to the non-rotating part 78. This assures that the net pressure moment acting on the part 78 does not change as its relative axial position changes with respect to the cavity 84A in the housing 84 and, therefore, that no structural deflections are generated. Third, a clearance must exist radially between the non-rotating part 78 and the surfaces of the radially-spaced walls of the housing 84 defining the cavity 84A to prevent binding and to allow relative axial motion between the two. For large clearances and/or very high pressures it may be necessary to restrict the radial eccentric position of the part 78 to a value less than this clearance in order to prevent part distortion resulting from eccentric, non-symmetrical axial pressure forces. A minimum of three centering splines (combined with rotation locks) spaced circumferentially and equally apart could be used to restrict the magnitude of this eccentricity while otherwise allowing complete freedom of movement of the part 78.

Figure 9:
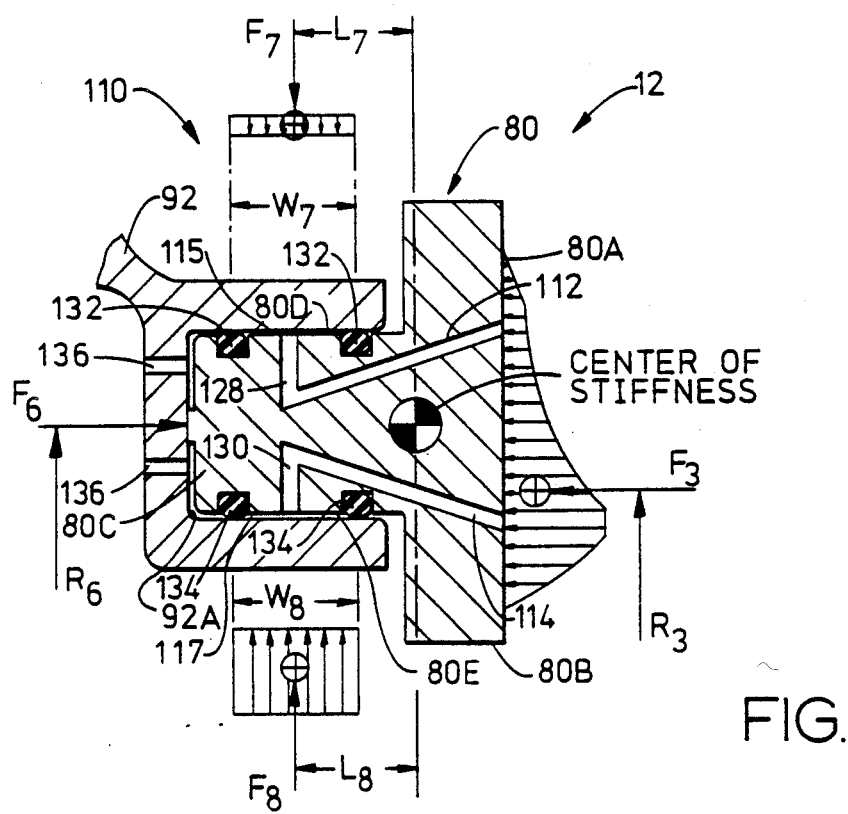
FIG. 9 is a schematic axial sectional view of a modified form of the secondary pressure balance mechanism of the improved apparatus of FIG. 8.
Figure 10:
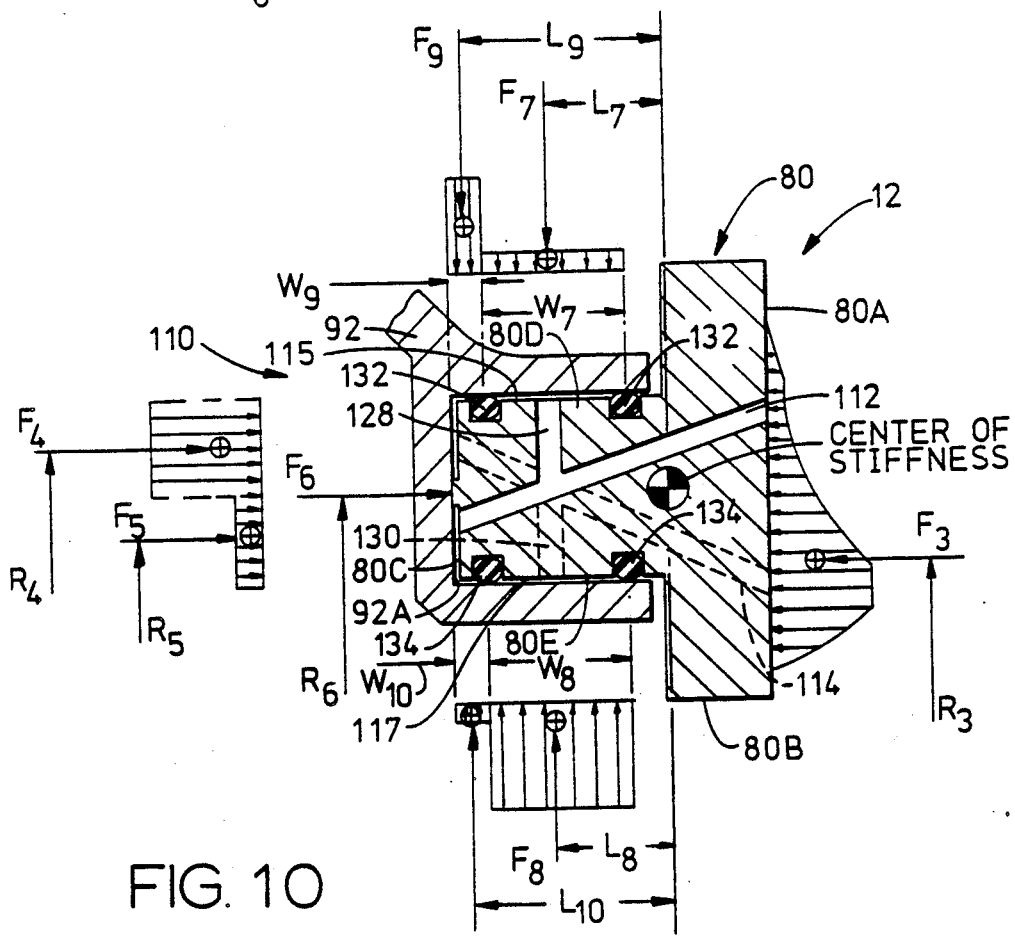
FIG. 10 is a schematic axial sectional view of another modified form of the secondary pressure balance mechanism of the improved apparatus of FIG. 8.

As seen in alternative embodiments in FIGS. 9 and 10, the secondary pressure balance means 110 can be modified to provide additional pressure moments to the rotating part 80 in a direction to promote parallelism between the interface end surfaces 78A, 80A of the parts 78, 80. Specifically, the secondary pressure balance means 110 can include radially-spaced non-intersecting pluralities of third and fourth conduits 128, 130 intersecting with the respective first and second conduits 112, 114 and extending and providing flow communication between the first and second conduits and opposite outer and inner annular surfaces 80D, 80E of the rotating part 80 located between outer and inner pairs of seal rings 132, 134. In FIG. 10, the first and second conduits 112, 114 extend to and open into the compartments 115, 117 at the forward outer and inner surfaces of part 80. In FIG. 9, the first and second conduits 112, 114 terminate midway across the part 80 where they intersect with the respective third and fourth conduits 128, 130.

With the configuration of the conduits 112, 114, 128, 130 through the part 80 in FIG. 9, the non-symmetrical pressure gradient established in the interface between the parts 78, 80, if tapering occurs, is transmitted to circumferential areas $W_7$, $W_8$, with each area bounded axially by the static seal rings 132, 134 and located on the outside and inside diameters of the part 80, respectively. The forward end surface 80C of the part 80 is vented to low ambient pressure by provision of vents 136 in the rotor 92. The moment promoting parallelism between the interface of the parts 78, 80 are $F_3 \times (R_6 - R_3) - (F_7 \times L_7) + (F_8 \times L_8)$. With this configuration, the W and L dimensions can be adjusted to increase or decrease the pressure moments as required to optimize the design.

The configuration of FIG. 10 combines the features of both FIGS. 8 and 9 by arranging the pressure conduits 112, 114, 128, 130 to the forward end surface 80C and to the outside and inside diameters of the part 80. Forces and dimensions required to establish pressure moments are shown in FIG. 10. With this configuration, both radial and axial pressure moments are generated about the center of stiffness of the part 80 in the direction to reduce interface taper. Circumferential areas $W_9$, $W_{10}$ should be maintained at a minimum because the torsional moments generated by pressures acting on these areas are in the direction to increase interface taper.

Again, it should be understood that the improved apparatus 12 is not limited to the application illustrated nor to the unducted fan type of gas turbine engine. The principles of the improved apparatus 12 can be usefully applied to any other applications and in any other types of gas turbine engines where hydraulic balancing of axial forces between relatively rotating parts would be an effective approach.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. In a gas turbine engine having relatively rotatable first and second structures, an axial thrust force-compensating apparatus comprising:
   (a) a first annular part mounted to said first engine structure and having an annular end surface;
   (b) a second annular part mounted to said second engine structure and having an annular end surface which opposes and faces toward said annular end surface of said first annular part; and
   (c) primary hydraulic pressure balance means defined in said first annular part for providing separate outer and inner fluid flows through said first part to respective outer and inner regions between said end surfaces of said first and second parts at respective first and second pressures responsive to the amount of separation existing between said end surfaces at said regions, said separate fluid flows at said first and second pressures producing a film of fluid flowing between and in contact with said respective end surfaces which generates primary compensating moment forces acting on said end surfaces to maintain said end surfaces in generally parallel relationship.

2. The apparatus as recited in claim 1, wherein said primary pressure balance means includes a plurality of hydrostatic pockets defined in said annular end surface of said first annular part, each pocket spanning a separate arcuate portion of said annular end surface and facing toward said end surface of said second annular part, each pocket being formed by a pair of radially spaced and separate outer and inner arcuate-shaped grooves being unconnected to one another.

3. The apparatus as recited in claim 2, wherein said primary pressure balance means also includes outer and inner pluralities of flow control orifices defined in said first annular part for receiving a pressurized flow of fluid, said outer orifices opening in said outer grooves and said inner orifices opening in said inner grooves for communicating said inner and outer fluid flows to said respective outer and inner grooves at said first and second pressures responsive to the amount of separation existing between said end surfaces of said first and second annular parts.

4. The apparatus as recited in claim 1, further comprising:
   secondary hydraulic pressure balance means defined in said second annular part for producing secondary compensating moment forces which complement said primary compensating moment forces produced by said primary pressure balance means to limit the magnitude of any non-parallel relationship between said end surfaces of said first and second parts.

5. The apparatus as recited in claim 4, wherein said secondary pressure balance means includes circumferentially-spaced non-intersecting pluralities of first and second conduits formed in said second part and extending generally in opposite diametric relationships across said second part from said end surface thereof toward an opposite end surface thereof.

6. The apparatus as recited in claim 5, wherein said secondary pressure balance means also includes:
   outer and inner annular compartments defined at said opposite end surface of said second part;
   said first and second conduits extending and providing flow communication between respective outer and inner grooves in said end surface of said first part and said inner and outer compartments at said opposite end surface of said second part.

7. The apparatus as recited in claim 5, wherein said secondary pressure balance means also includes radially-spaced non-intersecting pluralities of third and fourth conduits intersecting with said respective first and second conduits and extending and providing flow communication between said first and second conduits and opposite outer and inner annular surfaces of said second part.

8. The apparatus as recited in claim 7, wherein said first and second conduits extend to and open at said opposite end surface of said second part.

9. The apparatus as recited in claim 7, wherein said first and second conduits terminate midway across said second part where they intersect with said respective third and fourth conduits.

10. In a gas turbine engine having relatively rotatable first and second structures with respective annular cavities which face toward one another, an axial thrust force-compensating apparatus, comprising:
    (a) a first annular part mounted in said annular cavity of said first engine structure and having an annular end surface;
    (b) a second annular part mounted in said annular cavity of said second engine structure and having an annular end surface which opposes and faces toward said end surface of said first annular part;
    (c) primary hydraulic pressure balance means defined in said first annular part for providing separate outer and inner fluid flows through said first part to respective outer and inner regions between said end surfaces of said first and second parts at pressures responsive to the amount of separation existing between said end surfaces at said regions, said separate fluid flows at said pressures producing a film of fluid flowing between and in contact with said respective end surfaces which generates primary compensating moment forces acting on said end surfaces to maintain said end surfaces in generally parallel relationship; and
    (d) secondary hydraulic pressure balance means defined in said second annular part for producing secondary compensating moment forces which complement said primary compensating moment forces produced by said primary pressure balance means to limit the magnitude of any non-parallel relationship between said end surfaces of said first and second parts.

11. The apparatus as recited in claim 10, wherein said primary pressure balance means includes a plurality of hydrostatic pockets defined in said annular end surface of said first annular part, each pocket spanning a separate arcuate portion of said annular end surface and facing toward said end surface of said second annular part, each pocket being formed by a pair of radially spaced and separate outer and inner arcuate-shaped grooves being unconnected to one another.

12. The apparatus as recited in claim 11, wherein said primary pressure balance means also includes outer and inner pluralities of flow control orifices defined in said first annular part for receiving a pressurized flow of fluid, said outer orifices opening in said outer grooves and said inner orifices opening in said inner grooves for communicating said inner and outer fluid flows to said respective outer and inner grooves at said pressures responsive to the amount of separation existing between said end surfaces of said first and second annular parts.

13. The apparatus as recited in claim 10, further comprising:
    means sealably mounting said first part in said annular cavity of said first engine structure and for axial movement of said first part within said cavity relative to said first engine structure.

14. The apparatus as recited in claim 10, further comprising:
    means for sealably mounting said second part in said annular cavity of said second engine structure.

15. The apparatus as recited in claim 10, wherein said secondary pressure balance means includes circumferentially-spaced non-intersecting pluralities of first and second conduits formed in said second part and extending generally in opposite diametric relationships across said second part from said end surface thereof toward an opposite end surface thereof.

16. The apparatus as recited in claim 15, wherein said secondary pressure balance means also includes radially-spaced non-intersecting pluralities of third and fourth conduits intersecting with said respective first and second conduits and extending and providing flow communication between said first and second conduits and opposite outer and inner annular surfaces of said second part.

17. The apparatus as recited in claim 16, wherein said first and second conduits extend to and open at said opposite end surface of said second part.

18. The apparatus as recited in claim 16, wherein said first and second conduits terminate midway across said second part where they intersect with said respective third and fourth conduits.

19. The apparatus as recited in claim 15, wherein said secondary pressure balance means also includes:
    outer and inner annular compartments defined at said opposite end surface of said second part in flow communication with said annular cavity of said second engine structure;
    said first and second conduits extending and providing flow communication between respective outer and inner grooves in said end surface of said first part and said inner and outer compartments at said opposite end surface of said second part.

20. The apparatus as recited in claim 19, wherein said outer and inner compartments are formed at said opposite end surface of said second part by a land structure projecting therefrom and contacting said second engine structure within said annular cavity thereof.

* * * * *